United States Patent Office 3,522,004
Patented July 28, 1970

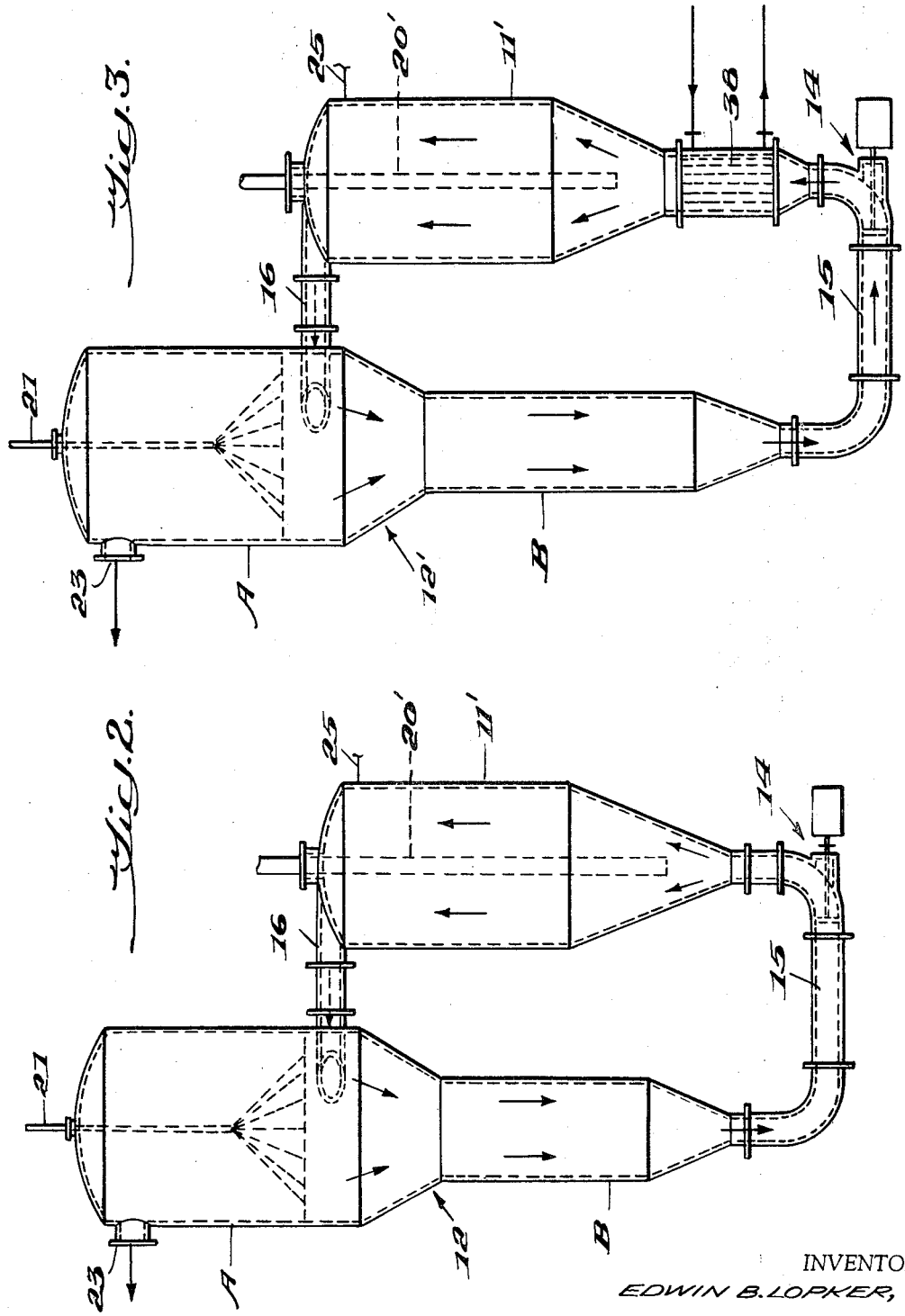

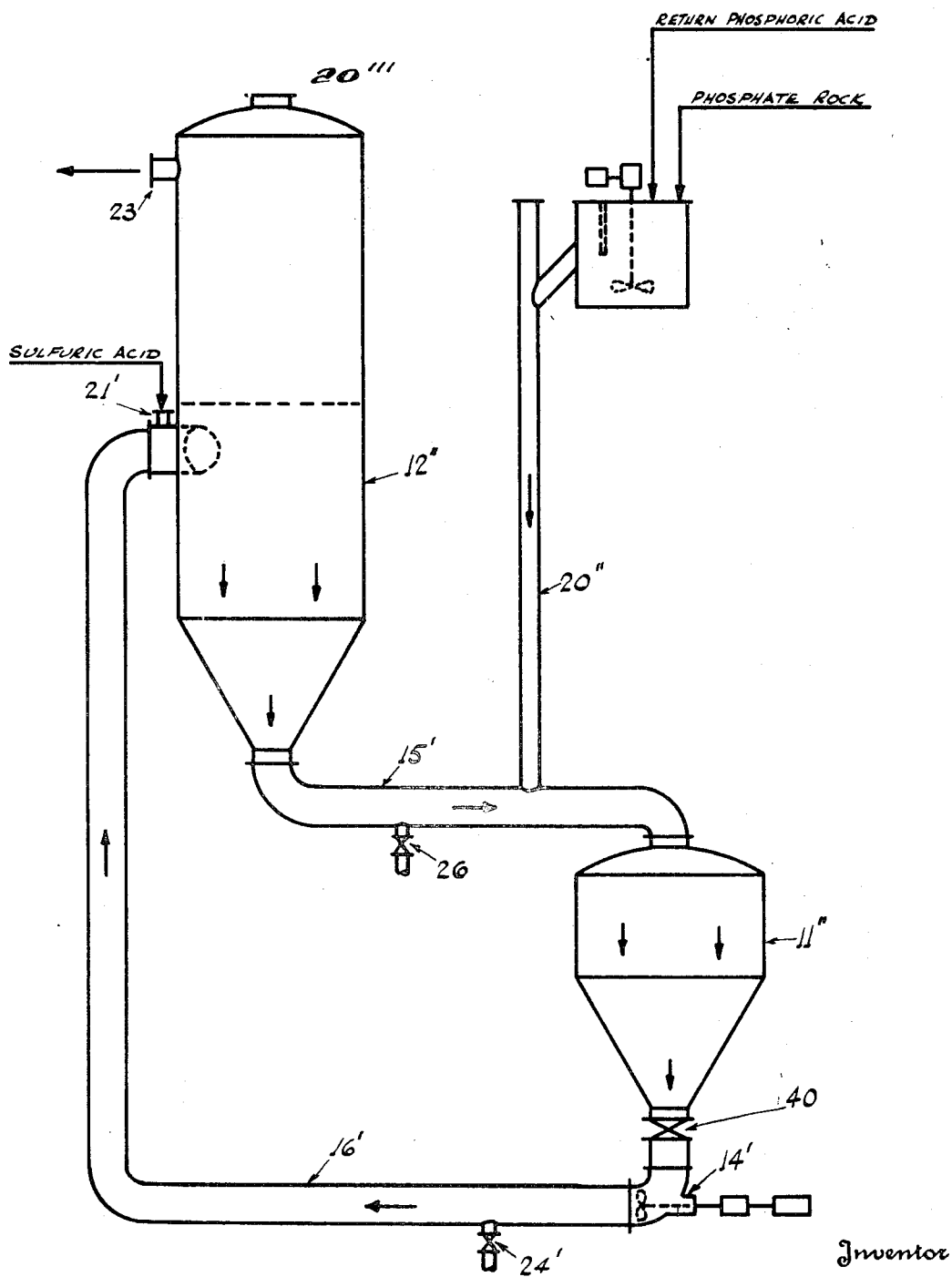

3,522,004
PROCESS AND APPARATUS FOR PRODUCING PHOSPHORIC ACID FROM PHOSPHATE ROCK
Edwin B. Lopker, Fort Lauderdale, Fla., assignor to Pullman Incorporated, Chicago, Ill., a corporation of Delaware
Continuation-in-part of application Ser. No. 518,229, Jan. 3, 1966. This application Apr. 19, 1966, Ser. No. 543,723
Int. Cl. C01f 1/46; C01b 25/22
U.S. Cl. 23—165
25 Claims

ABSTRACT OF THE DISCLOSURE

The invention concerns a process for the manufacture of phosphoric acid and calcium sulfate by the reaction of calcium phosphate and sulfuric acid which includes circulating the entire reactant mass at a high rate of circulation within the reactant system and adding controlled quantities of calcium phosphate rock, recycle phosphoric acid, and sulfuric acid reactants into the reactant system in a manner controlled as to location of the points of addition so as to control calcium sulfate concentration gradients and thereby prevent excessive formation of fine calcium sulfate crystals. Cooling of the reactant system is carried out by evaporative cooling of the entire recirculating reactant mass so that the temperature gradients resulting from removal of the heat of reaction are not so large as to occasion excessive fine crystal formation.

This application is a continuation-in-part of application Ser. No. 518,229 filed Jan. 3, 1966, now abandoned.

This invention relates to the manufacture of phosphoric acid by the wet process, i.e., the reaction of phosphate rock with sulfuric acid to produce phosphoric acid and calcium sulfate, and to the apparatus for carrying out this process.

The basic reactions taking place in the wet process for the manufacture of phosphoric acid are well known. Phosphate rock is added to a quantity of phosphoric acid, usually to a slurry of phosphoric acid and calcium sulfate crystals in the reactor system, and the phosphate rock is dissolved by part of the phosphoric acid. Sulfuric acid is concurrently added and reacts with the dissolved phosphate to form phosphoric acid and calcium sulfate. The calcium sulfate crystallizes out and is separated from the phosphoric acid by filtration and washing. The calcium sulfate crsytallizes as gypsum ($CaSO_4 \cdot 2H_2O$) under the conditions employed in most commercial operations of the process and the crystals are washed essentially free of phosphoric acid in the filtration system, using water, and the washings are returned to the reactor system.

It is desired in commercial variations of this process to introduce the phosphate rock and the sulfuric acid to the reactor system in such a manner and under such conditions that excessive concentrations of dissolved phosphate rock do not occur in the reactor system, as well as to avoid excessive concentrations of unreacted sulfuric acid in the reactor system. If an excessive concentration of sulfuric acid contacts the phosphate rock before it dissolves, it will coat the particle of phosphate rock with calcium sulfate and inhibit further attack. This results in excessive losses due to unreacted phosphate rock lost with the calcium sulfate. On the other hand, an excessive concentration of dissolved phosphate rock results in the crystallization of calcium phosphate, concurrently with the crystallization of the calcium sulfate. This also results in loss of phosphate values as the co-crystallization of the phosphate and calcium sulfate precludes washing the phosphate out of the calcium sulfate in the filtration and washing system. In addition, if contact occurs in the reactor system between excessive concentrations of sulfuric acid and dissolved phosphate the resulting calcium sulfate is formed so rapidly and in such high concentration that it precipitates in very fine crystals with the result that efficient separation of the phosphoric acid from the calcium sulfate in the subsequent filtration operation is adversely affected. And still further, such excessive concentrations and wide variations in the reactor system cause excessive scaling of the internal surfaces of the reactor system, resulting in the need for shutting down the system at periodic intervals for cleaning. Accurate control of the operating conditions in the reactor system is essential as the ratio of calcium to sulfate in the solution influences to a marked degree the filterability of the calcium sulfate crystals produced.

The degree of hydration, if any, of the calcium sulfate crystals formed in the reactor system is dependent upon the temperature level and the phosphoric acid content that is maintained in the reactor system slurry. For example, at a temperature of 75 to 80 degrees centigrade and with 32% $P_2O_5$ phosphoric acid the calcium sulfate will crystallize essentially as gypsum ($CaSO_4 \cdot 2H_2O$). At a temperature of 95 to 100 degrees centigrade and with 40% $P_2O_5$ phosphoric acid the calcium sulfate will crystallize essentially as the hemihydrate ($CaSO_4 \cdot \frac{1}{2}H_2O$). There are certain limitations that apply to the selection of temperatures and phosphoric acid strengths that may be proposed for any reactor system. For example, the selection of a lower temperature say 75 degrees centigrade, in combination with a high phosphoric acid strength, say 40% $P_2O_5$, would result, with most types of phosphate rock, in the formation of the calcium sulfate as an unstable mixture of gypsum and hemi-hydrate crystals with hydration and caking occurring on the filter when washing was attempted. In such a case, raising the temperature to say 95 degrees centigrade would produce essentially all of the calcium sulfate as a stable hemihydrate. Conversely, if the temperature was held at 75 degrees centigrade and the phosphoric acid strength reduced to say 32% $P_2O_5$, essentially all of the calcium sulfate would crystallize as a stable gypsum. There are other factors affecting the type of crystals formed in, and their growth in, the reactor system and their filterability. Some of these factors are the fluorine content, the alumina content, the active silica content and its ratio to the fluorine content, etc., only the major factors which generally apply being outlined above.

Most of the reactor systems presently in commercial operation employ some means of recirculation of a slurry of phosphoric acid and calcium sulfate crystals in order to minimize the excessive concentrations that have been referred to. Generally this recirculation consists of a combination of the so-called "recirculation" produced by a stirrer or agitator in a tank plus some degree of actual recirculation by returing reactor slurry from a later stage of the reactor system to an earlier stage. The various commercially employed systems can be conveniently separated into two groups. In the first group may be placed the so-called "single-tank" reactor systems and in the second group may be placed the "multi-tank" or "multi-compartment" reactor systems. In one of the "single-tank" systems one large tank is used, provided with as many as 10 agitators or stirrers. The phosphate rock and sulfuric acid are introduced each at one point in the tank. While seeming to have the advantage of simplicity, this system makes the addition of phosphate rock and sulfuric acid very different to accomplish without having localized excessive concentrations. The so-called "recirculation" is large but basically uncontrolled and wide variations in concentrations occur. In another so-called "single-tank" reactor system a small tank is placed concentrically in a single large tank to form an annulus between the two tanks. Phosphate is introduced at one end of a diameter and the sulfuric acid and return phosphoric acid (from the calcium sulfate filtration and washing system) are introduced together approximately at the other end into the annulus. The annulus is provided with a number of agitators and baffles are introduced in the annulus to cause the slurry to generally recirculate around the annulus, with the slurry production passing into the small center tank. This system provides fairly large recirculation rates although not under any positive control.

In the "multi-tank" or "multi-compartment" group the reactor system consists of a relatively large number of individually agitated tanks or compartments, usually between 6 and 12 in number, so arranged that the flow of slurry is generally in series from tank to tank (or compartment to compartment) and slurry is pumped from the last tank back to the first tank, thus providing recirculation. Although such pumping provides control of recirculation rates the pumping costs are high and recirculation rates in excess of 15 to 1 are rarely employed. Phosphate rock, sulfuric acid and return phosphoric acid are introduced at various points and the pumped stream of recirculated slurry is generally cooled before being returned to the system. Many variations of the system just described are currently in operation and all of them operate at essentially atmospheric pressure. Equipment is large and costly with average residence times in the reactor system being from 4 hours to as much as 8 to 10 hours.

The production of phosphoric acid by the wet process is an exothermic reaction and relatively large quantities of heat must be removed in order to maintain the desired temperature in the reactor system. In some systems the sulfuric acid is diluted and the corresponding heat of dilution removed before the acid is introduced to the reactor system. This reduces the amount of heat generated in the reactor system and allows the sulfuric acid to be added to the reactor with less chance of localized overconcentration since the acid is, in effect, pre-diluted with water. Although this procedure is widely practiced, it has certain disadvantages. First, all water used for dilution of the sulfuric acid must be deducted from the total water allowable for use in washing the calcium sulfate free of phosphoric acid on the filter. This may result in higher losses if the same strength of phosphoric acid is to be produced, or lower strength of phosphoric acid if the quantity of wash water is not reduced. Second, assuming all other conditions remain the same, practical methods of reactor system cooling are based essentially on evaporative cooling (either by air or vacuum) and reducing the amount of heat available for the evaporation of water from the reactor system results in a lower strength of product phosphoric acid from the reactor system.

The removal of the exothermic heat of reaction is generally accomplished by one or the other of two methods and, occasionally, by a combination of both. The first method consists of blowing air into or below the surface of the slurry in the reactor. Large quantities of air are required, the cooling being obtained principally by evaporation of water into the air. By careful design of the jets introducing the air, power costs for air handling can be minimized but a number of disadvantages are encountered. The air jets become incrusted with solids and require periodic cleaning, often at eight-hour intervals. In addition, the air carries quantities of noxious fluorine-containing gases and fumes out of the reactor in very dilute concentrations. Even phosphate rock dust may be carried out. All of this large volume of air must be scrubbed clean before being released back to the atmosphere. Further, under adverse conditions of high atmospheric temperature and humidity, it may become difficult to introduce sufficient air into the reactor to remove the heat and keep the temperature of the reactor slurry at the desired level.

The second method of removing heat from the reactor system is by vacuum cooling. A portion of the reactor slurry is pumped into a vacuum chamber where the reduced pressure causes the boiling off of water and the cooled slurry returns, usually via a barometric leg, to the reactor system. It is usual practice for the pumped stream of recirculation slurry, which was referred to under the description of "multi-tank" reactor systems, to pass through such a vacuum chamber before being returned to the reactor system. Vacuum cooling can also be used with "single-tank" systems although air cooling is more generally used in such systems. The vacuum cooling method has the advantage of excellent control and also avoids diluting the fumes with the large quantities of air that make subsequent removal difficult. It has disadvantages, however, the principal one being the necessity of pumping very large quantities of slurry with attendant high power costs, high slurry line and pump maintenance, etc. Practical limitations of the pumping volume means that the maximum reduction of slurry temperature per pass through the vacuum chamber must be approached. This results in an appreciable increase in concentration causing excessive scaling in the vacuum chamber and associated lines. The relatively large change in concentration per pass also causes the precipitation of very fine crystals of calcium sulfate adversely affecting the subsequent filtration and washing system. Even with the vacuum cooling method the reactor system gives off a considerable volume of fumes and scrubbing systems are required but the volume is much smaller than encountered with the air cooling method.

With these precepts in mind, a primary object of this invention is to provide a system for the manufacture of wet process phosphoric acid which maximizes the formation of large crystals of calcium sulfate and at the same time utilizes comparatively simple equipment involving the expenditure of only low power for pumping and agitation. This object is achieved by circulating the reaction mixture through a vessel and a pipe leading externally from one end of the vessel and returning either directly to said vessel or through a second vessel, so that the velocity in the vessel or vessels is a small fraction of that in the pipe, and sulfuric acid on the one hand and phosphate rock on the other are introduced into the stream at points separated from each other along the circulation path, the rate at which the reactants are added being small compared with the rate of circulation of the reaction mixture.

The process and arrangements of apparatus will be more fully understood from the detailed description below, reference being taken to the drawings wherein FIG. 1 illustrates an arrangement of apparatus in accordance with the invention;

FIG. 2 illustrates a modified form of apparatus;

FIG. 3 illustrates a further modification; and

FIG. 4 illustrates a still further modification, and FIG. 5 also illustrates another modification.

Figure 1:
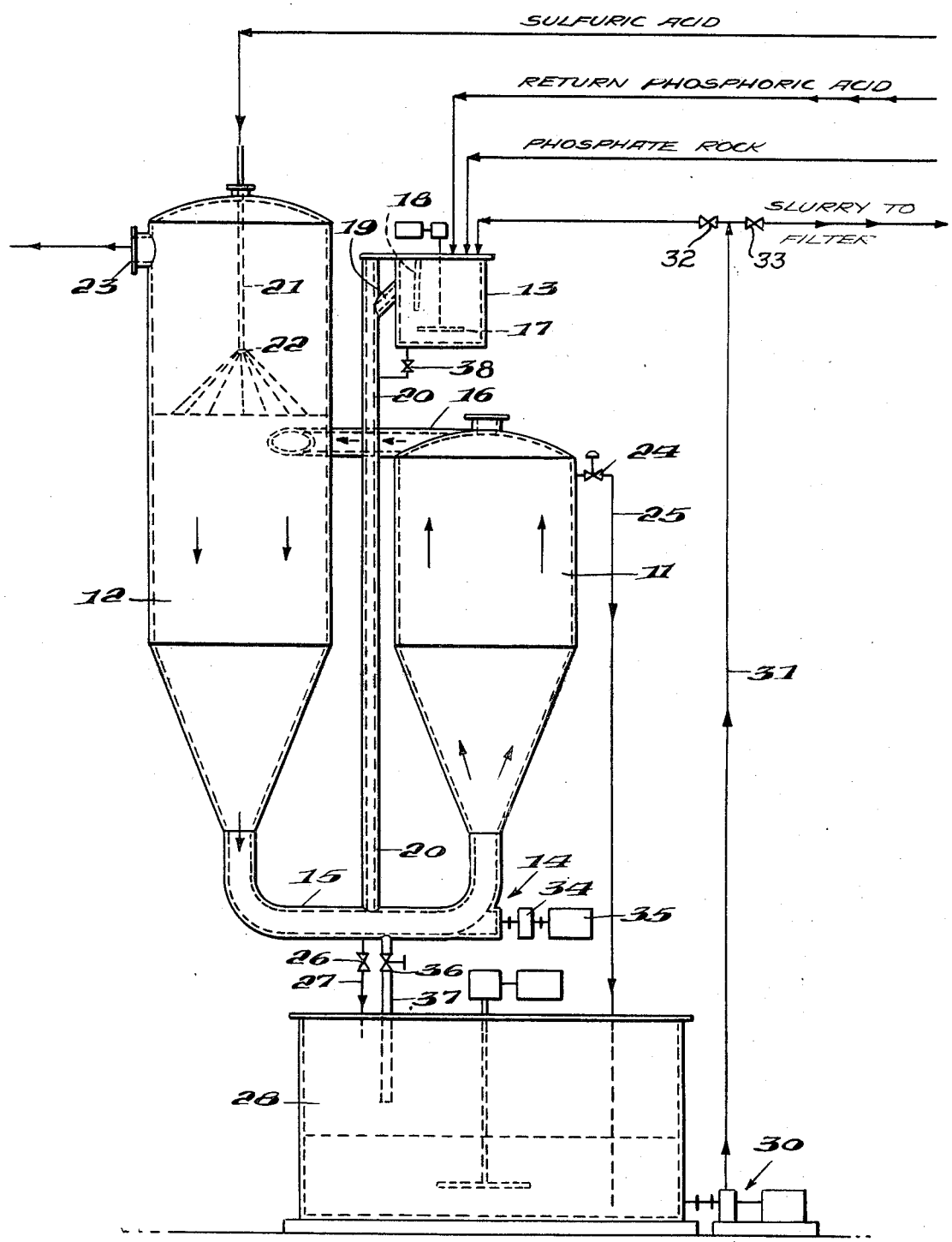

Referring now to FIG. 1, the system includes a small premixer 13 in which the phosphate rock is slurried with return phosphoric acid from the filtration and washing system (not shown), and reaction vessels 11 and 12 which are connected hydraulically by piping 15 and 16 so the pump 14 operates under no hydrostatic differential head; it needs to overcome only the resistance to flow in the circulating system. The short length and large diameter of piping 15 and 16 results in low resistance to flow and large volumes of slurry may be circulated in the system at low power costs. Premixer 13 is provided with an agitator 17 which mixes the phosphate rock and return acid to form a slurry. By-passing is prevented by baffle 18 and the slurry passes out of the premixer 13 via an adjustable level overflow 19 into pipe 20. Pipe 20 directs the slurry into pipe 15 at which point the pressure in the reactor system is above atmospheric pressure. This allows the slurry to enter the system by gravity without permitting any atmospheric air to enter the system via pipe 20. Pipe 20 drops vertically to pipe 15 without bends or traps to insure that no plugging can occur.

The basic function of premixer 13 is the slurrying of the phosphate rock into the return acid in order to facilitate introducing the rock into the reactor system. The volume of premixer 13 is intentionally small so that the average residence time is very short, normally less than 120 seconds. Even so, small amounts of carbonate in the phosphate rock react very quickly under the acid conditions existing in premixer 13 and carbon dioxide is evolved. This is desirable as the carbon dioxide liberated at this point escapes from the system and so reduces the quantity of non-condensables that must be handled by the vacuum system which maintains the reduced pressure in reactor vessels 11 and 12. Even with this short retention time, some phosphate rock begins to dissolve in the return phosphoric acid. While not critical for some types of phosphate rock, overflow 19 is made adjustable so that the overflow point can be raised or lowered to increase or decrease the retention time in premixer 13. An anti-foam agent may be added to premixer 13 to control foaming in premixer 13 and/or reactor vessel 12.

As the slurry leaves pipe 20 and passes into pipe 15 it is immediately dispersed into and mixes with large volume of recirculating slurry, thorough mixing being insured by passing the slurry through pump 14, the mixed slurry then passing into reactor vessel 11. The phosphate rock rapidly dissolves in the liquid phase of the recirculating slurry and so raises the calcium content of the liquid phase by a small amount. As this occurs, the liquid phase becomes reduced in sulfate content as calcium sulfate leaves the solution, largely by crystallization on the great mass of calcium sulfate crystals present in the recirculating slurry. If needed, the increasing diameter of reactor vessel 11 may be so selected to control upward velocity of the larger particles of phosphate rock allowing more time for dissolving.

It is well known that the rate of solution of the phosphate rock is dependent upon the particle size of the rock. It is not recognized, however, that the rate of solution of the phosphate rock can be so rapid that substantial quantities of calcium sulfate may be crystallized under conditions where more calcium is present in solution in the liquid phase of the reactor slurry than necessary to maintain the rate of crystal growth of the calcium sulfate. This results in higher losses than necessary due to the concurrent crystallization of calcium phosphate as has been previously mentioned. In this connection the retention time in reactor vessel 11 is intentionally restricted to minimize this condition. In some cases the rate of solution of the phosphate rock may be sufficiently rapid so that vessel 11 becomes little more than a pipe connecting pump 14 to pipe 16 (FIGS. 1, 2 and 3) or pipe 15' (FIG. 4).

As the slurry reaches the top of reactor vessel 11, with the phosphate rock largely dissolved, it passes through pipe 16 into the second reactor vessel 12 where the sulfuric acid is added to the system. Although a variety of means of adding the sulfuric acid to the large volume of recirculating slurry can be used, it is preferred to introduce it via pipe 21 to spray nozzle 22 and spray the acid in a coarse heavy spray onto the surface of the recirculation slurry in reactor vessel 12. In addition to providing a primary dispersion of the sulfuric acid, the heavy spray breaks up foam that forms on the surface of the slurry in the reactor vessel 12. The coarseness of the spray is also an important factor in minimizing the absorption of water vapor by the droplets of sulfuric acid before they reach the slurry surface and are dispersed in the slurry. Such absorption of water vapor causes an undesirable recycle of both heat and water in the upper portion of reactor vessel 12. The sulfuric acid could also be introduced into the pipe 16, if desired, where the relatively high velocity of the recirculating slurry effectively disperses the sulfuric acid.

It is important to note that the solution of the phosphate rock added to the reactor slurry going to reactor vessel 11 will raise the calcium content (CaO) of the phosphoric acid in the recirculating slurry by a small amount. Also the addition of the sulfuric acid raises the sulfate content of the liquid phase of the slurry by a small amount and the calcium content is reduced by crystallization of calcium sulfate, largely on the great mass of sulfate crystals already present in the recirculating slurry.

According to applicant's copending application Ser. No. 543,648 the increase in calcium content in the recirculating slurry, measured as CaO should not exceed about 1%, preferably 0.5%, calculated for complete dispersion and for solution but without precipitation, and the increase in sulfate content should not exceed about 1.75%, preferably 0.875%, measured as $H_2SO_4$, calculated for complete dispersion of the acid but not precipitation.

These small changes insure growth of the calcium sulfate crystals and avoid precipitation of excessive quantities of fine crystals. As crystallization is occurring continuously in the reactor system these calculated increases in concentration are not to be found by analysis of the reactor slurry. The desirable calculated increase in concentration may be determined experimentally and will vary with different types of phosphate rock but will generally be less than the above amounts.

Removal of the exothermic heat of reaction occurs by vaporization of water under the reduced pressure conditions maintained in the upper portions of reactor vessels 11 and 12, by a vacuum applied at pipe 23, and the vapor, along with various non-condensables and fumes, leaves the surface of the recirculating slurry in reactor vessel 12 and passes, via the outlet 23 to the scrubbing, condensing and vacuum producing equipment (not shown). Although the quantity of heat to be removed is large, the quantity of recirculating slurry is relatively so much greater that only very small temperature differences occur in the reactor system. For example, with an assumed grade of phosphate rock of, say 31% $P_2O_5$, and using sulfuric acid at, say 93% $H_2SO_4$, and producing phosphoric acid (the liquid phase in the reactor slurry) at a strength of, say 32% $P_2O_5$, the maximum temperature differential of the slurry, when providing a large but reasonable and conservative rate of recirculation, would be about 1½ degrees centigrade and the increase in $P_2O_5$ content of the phosphoric acid in the slurry is only about 9/100 of 1%. The result of these very small differentials is to essentially eliminate both the troublesome scaling and the precipitation of excessive quantities of fine crystals of calcium sulfate. Present commercial systems using vacuum cooling commonly operate with differentials 3 to 4 times as great as these.

To return to the slurry in the upper portion of reactor vessel 12, after the sulfuric acid has been added the slurry passes down through the reactor vessel 12, with crystallization and growth of calcium sulfate crystals continuing, the slurry finally being returned to vessel 11 by pump 14 from the bottom of reactor vessel 12 via the pipe 15. Although the operation has been described stepwise, it will be understood that in actual practice it is continuous, the inputs and outputs of the system as well as the recirculation of slurry within the system being carried out continuously. Although the phosphate rock is largely dissolved in reactor vessel 11, the crystallization of calcium sulfate occurs, to greater or lesser extent, in the entire reactor system.

Slurry is withdrawn from the system in order to keep the slurry level in reactor vessel 12 at the desired point, just above the inlet pipe 16. This is done by means of valve 24 and pipe 25 or by valve 26 and pipe 27 or by a combination of both. Both of the pipes 25 and 27 discharge slurry to an agitated filter feed tank 28, the pipe 25 being submerged in the slurry tank 28 since it is connected to a point in the reactor system which is below atmospheric pressure. The larger valve 36 and pipe 37 are provided to quickly drain the reactor system (for inspection, in case of power failure, etc.) into tank 28 which is made large enough to accommodate this volume in addition to its normal operating level. The pipe 37 extends into the tank 28 a sufficient distance so that the end of the pipe 37 is well submerged after the reactor system is drained into tank 28. Thus, when it is desired to refill the reactor system, the pipe 20 can be closed off by any convenient means and vacuum applied to the reactor system resulting in sufficient slurry being rapidly drawn up into the reactor system to enable pump circulation to begin at a reduced rate. The balance of the slurry required to completely refill the reaction system may then be provided by use of the pump 30, pipe 31 and valve 32. The premixer 13 may be drained into pipe 20 by means of valve 38. The slurry in the tank 28 is pumped to the filter system (not shown) by pump 30 via the pipe 31 and valve 33.

The circulating pump 14 is provided with a variable speed device 34 between pump 14 and drive motor 35 to obtain variable speed operation of the pump and variable rates of slurry recirculation. This is not normally required unless the system is intended to operate from time to time with substantial differences in the strength of phosphoric acid produced by the reactor system, or with wide variations in the solids content of the recirculating slurry and/or with alternate types of phosphate rock which may require very substantial changes in operating conditions. It will be recognized that certain limitations exists with respect to the minimum rate of recirculation in relation to the maximum cross-sectional areas provided by reactor vessels 11 and 12. This is that the rate of slurry flow must be sufficient to prevent any undue segregation of solids in the reactor system. Other than this limitation, no limitations are to be inferred as to the sizes, proportions or shapes which may be utilized in providing a reaction system as herein described.

FIG. 2 illustrates a modified reactor system in which the reactor vessel 11' has a somewhat reduced cross-section. The reactor vessel 12' retains the larger diameter in the upper portion A with a sharply reduced cross-section in the lower portion B. Also shown in FIG. 2 is an alternate location for the pipe which introduces the slurry of phosphate rock and return acid to the system, pipe 20', and an alternate location for the pipe which introduces sulfuric acid to the system, pipe 21'.

In the description of this new design of reactor system, the system has so far been confined to one in which the heats of reaction and heats of dilution are the only sources of heat (other than minor variations due to differences in the sensible heat content of inlet and outlet materials). In other words, no outside heat is added. Under these conditions the maximum strength of phosphoric acid that can be produced is limited by the heat available to evaporate water, the major source of this water being the water needed to wash the calcium sulfate crystals essentially free of phosphoric acid in the filtration and washing system. With the designs now operating commercially, using the best practice in evaporative cooling, the strength of phosphoric acid produced from the reactor system is generally about 30% to 32% $P_2O_5$. A substantial proportion of the phosphoric acid so produced from commercial reactor systems is subsequently concentrated, usually to 54% $P_2O_5$. FIG. 3 illustrates a modification of the reactor system previously described, this modification being the addition of a heat exchanger 39. To allow the input of additional heat to the reactor system and so allow the production of a strength of phosphoric acid directly from the system that otherwise might not be possible. The high solids content of the recirculating slurry virtually eliminates fouling of the heat exchanger surfaces, a problem commonly experienced in present commercial operation of vacuum evaporators on wet process phosphoric acid. The practical advantages of being able to produce phosphoric acid from the reactor system at higher strengths than possible by presently utilized designs can be briefly illustrated. Assuming that a phosphoric acid of 31% $P_2O_5$ is produced from the reactor system and that this acid is then concentrated to 54% $P_2O_5$, the production of phosphoric acid at about 36% $P_2O_5$ would eliminate about one-third of the previously required evaporative capacity, at about 40% $P_2O_5$ about one-half is eliminated, at about 43% $P_2O_5$ two-thirds is eliminated, etc.

In the event that the calcium sulfate crystals become so large and heavy as to make it difficult to carry them upward in suspension in vessel 11, a flow circuit as shown in FIG. 4 in which the flow in both vessel 11" and vessel 12" is downward is preferred. The vertical spacing of the vessels is such that the pressure in the line 15' connecting the bottom of vessel 12" to the top of vessel 11" is somewhat above atmospheric pressure to permit introduction of the slurry of phosphate rock and return phosphoric acid into the line 15' by gravity via pipe 20". Pipe 20'", extending into vessel 12', can be used in place of pipe 20", if desired. In this arrangement a valve 40 is provided at the bottom of vessel 11" so that slurry may be retained in the system with only line 16' needing to be drained if it is desired to inspect pump 14'. The slurry production may be removed via valve 24' or valve 26'. Many other combinations of shapes and volumes resulting in variations in retention times, slurry velocities, vapor disengaging areas, etc., will readily come to mind.

Figure 5:
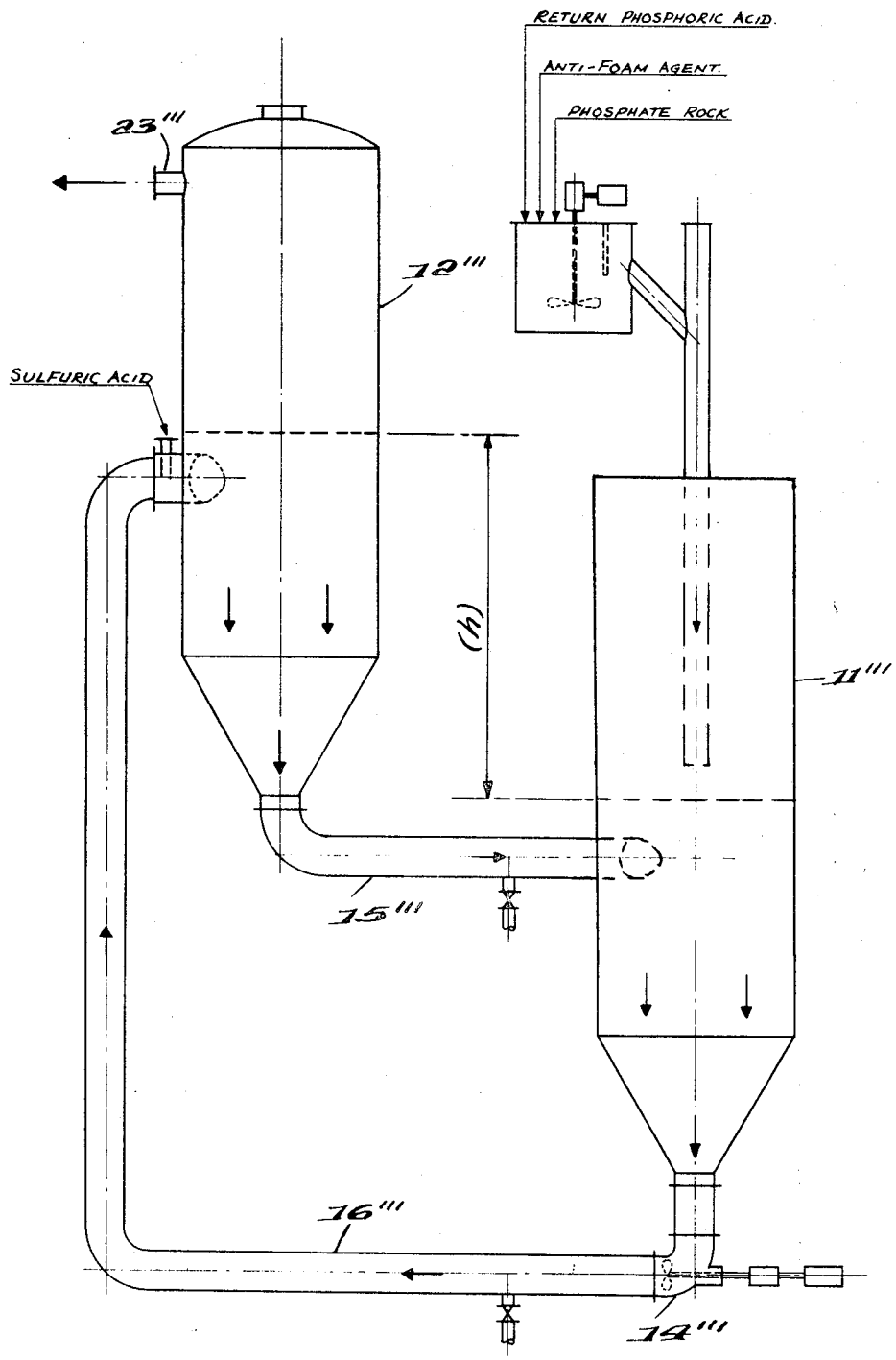

In FIG. 5 vessels 11'" and 12'" are offset vertically by a distance ($h$), that is equal to the vacuum applied at conduit 23'", when expressed as feet of slurry of the density existing in the reactor system. This permits vessel 12'" to operate at the required vacuum, applied through conduit 23'", while vessel 11"" is at atmospheric pressure. The phosphate rock-return phosphoric acid slurry can now be added directly to the surface of slurry in vessel 11'".

The following example serves to further illustrate this invention. The operating temperature level selected is 75 degrees centigrade. The basic raw materials for this design are phosphate rock of average reactivity containing 31% $P_2O_5$ and sulfuric acid supplied at 93% $H_2SO_4$.

Phosphate rock is supplied to the premixer 13 at the rate of 925 pounds per minute and return phosphoric acid, containing about 19% $P_2O_5$, is supplied at the rate of 200 gallons per minute. These materials are mixed to form a slurry of about 32% solids by weight, the volume being about 240 gallons per minute. This 240 gallons per minute of phosphate rock slurry is introduced into the reactor system via the inlet pipe 20. The reactor slurry, a mixture of 32% $P_2O_5$ phosphoric acid and gypsum crystals, is about 40% solids by weight and is recirculated by the circulating pump 14, at a rate of about 16,000 gallons per minute. The phosphate rock slurry entering pipe 15 via pipe 20 encounters the stream of reactor slurry flowing toward circulating pump 14. Volumetric dilution of the phosphate rock slurry by the reactor slurry is about 67 to 1. The mixed slurry passes upward through reactor vessel 11 which has a maximum inside diameter to allow a minimum upward linear velocity of slurry of about 34 feet per minute. From reactor vessel 11 the recirculating slurry passes through pipe 16 to reactor vessel 12. The slurry enters the vessel at a velocity of about 9 feet per second and this produces a turbulent swirling action in the upper portion of reactor vessel 12. The release of water vapor at this point increases the turbulent action. The reduced pressure in the system is maintained at about 22 inches of mercury vacuum in order to maintain the slurry temperature of 75 degrees centigrade.

About 30 gallons per minute of water vapor, liquid basis, plus noncondensable gases and fumes are released from the slurry surface with a reduction in slurry temperature of about 1½ degrees centigrade. The quantity of sulfuric acid introduced at this point is about 54 gallons per minute. The sulfuric acid is introduced as a coarse heavy spray and the volumetric dilution of the sulfuric acid by the reactor slurry is about 300 to 1. The reactor slurry then passes downwards in reactor vessel 12 and leaves reactor vessel 12 via pipe 15 returning to circulating pump 14.

In this system, no heat exchanger is used. The system has a productive capacity of 200 tons $P_2O_5$ per day and produces phosphoric at a strength of 32% $P_2O_5$ and the calcium sulfate is crystallized as gypsum.

It is claimed:

1. A process for the manufacture of phosphoric acid from phosphate rock and sulfuric acid comprising
passing a slurry containing phosphoric acid and calcium sulfate through means defining a closed flow path, said means comprising first and second vessels interconnected by conduit means external to said vessels, said slurry being passed through said vessels without reversals in direction of flow therein, maintaining within said first vessel a level of slurry vertically offset from the level of slurry maintained with said second vessel,
separately adding sulfuric acid and a mixture of phosphate rock and phosphoric acid to said slurry so that the sulfuric acid and phosphate rock-phosphoric acid mixture are each dispersed in said slurry and not concentrated at the point of addition of the other,
controlling the addition of sulfuric acid and phosphate rock-phosphoric acid mixture to said slurry so that the increases in calcium content and sulfate content respectively of the liquid phase of said slurry caused by such addition of reactants are such as to preclude significant coating of undissolved phosphate rock with calcium sulfate, significant calcium phosphate precipitation and excessive calcium sulfate crystallization in fine crystals, and
withdrawing phosphoric acid and calcium sulfate from said process.

2. The process of claim 1 wherein the incerase in calcium content does not exceed about 1%, measured as CaO, when calculated as complete dispersion and solution but without precipitation and the increase in sulfate content does not exceed about 1.75% measured as $H_2SO_4$, when calculated as complete dispersion but without precipitation.

3. The process of claim 2 wherein the calculated increases in calcium content and sulfate content do not exceed about 0.5% and 0.875%, respectively.

4. The process of claim 1 wherein the separation of the addition of the phosphate rock-phosphoric acid mixture and sulfuric acid to said slurry is attained by physical separation of the respective points of addition of the phosphate rock-phosphoric acid mixture and sulfuric acid along said flow path.

5. The process of calim 1 wherein the phosphate rock-phosphoric acid mixture is added to said second vessel and the sulfuric acid is added to said first vessel.

6. The process of claim 1, further including controlling the temperature of said slurry by the removal of heat by the evaporation of water in said first vessel to maintain the temperature of the slurry essentially constant.

7. The process of claim 6 wherein the sulfuric acid is introduced into said slurry by being sprayed on the surface of said slurry in said first vessel.

8. The process of claim 6 wherein the temperature is maintained constant throughout the slurry to within about 5° C.

9. The process of claim 8 wherein the temperature is maintained constant throughout the slurry to within about 2.5° C.

10. The process of calim 6 wherein the sulfuric acid is introduced into said slurry at or prior to the point said slurry enters said vessel.

11. The process of claim 5 wherein said slurry is flowed upwardly through said second vessel and said phosphate rock-phosphoric acid mixture is introduced into said second vessel in the lower portion thereof.

12. The process of claim 5 wherein said phosphate rock-phosphoric acid mixture is introduced into said slurry at or prior to the point said slurry enters said second vessel.

13. The process of claim 5 wherein the slurry is flowed downwardly through said second vessel and said phosphate rock-phosphoric acid mixture is introduced onto the surface of said slurry in said second vessel.

14. The process of calim 5 wherein the time elapsed from the addition of the phosphate rock-phosphoric acid mixture to said slurry and to the time the phosphate rock particles contact the incerased concentration of sulfuric acid caused by addition of sulfuric acid to the slurry is such in relation to the size of said particles that a part thereof has not dissolved in the liquid of said slurry before encountering such increased concentration of sulfuric acid.

15. The process of calim 5 wherein said slurry is passed through said vessels by pump means, a vacuum is maintained in said first vessel sufficient to maintain the level of said slurry within said first vessel at an elevation greater than the level of said slurry within the remainler of said flow path without imposing a hydrostatic pressure head on said pump means.

16. The process of calim 1 wherein said slurry is heated by indirect heat exchange means arranged in said flow path.

17. An apparatus for the manufacture of phosphoric acid from phosphate rock and sulfuric acid comprising
a first vessel maintained under vacuum and connected in flow communication with a second vessel by conduit means external to said vessels, said first and second vessels and said conduit means together defining a circuitous flow path adapted to permit passage without reversals in direction of flow within said vessels of a slurry containing phosphoric acid and calcium sulfate through said first vessel thence through said conduit means thence through said second vessel and back to said first vessel and adapted to maintain a slurry level in said first vessel vertically offset from the slurry level in said second vessel,
pump means adapted to circulate said slurry through said circuitous flow path,
outlet means adapted to withdraw slurry from said circuitous flow path, and
first inlet means adapted to add a mixture of phosphate rock and phosphoric acid and second inlet means adapted to separately add sulfuric acid to said slurry passing through said circuitous flow path so that the sulfuric acid and phosphate rock-phosphoric acid mixture are each dispersed in said slurry and not concentrated at the point of addition of the other.

18. The apparatus of claim 17 including first conduit means connecting the upper portions, respectively, of said first and second vessels and second conduit means connecting the lower portions, respectively, of said vessels, all said connections being at points below the level of said slurry to be passed through said flow path,
pump means adapted to pass said slurry at a high rate of circulation upwardly through said ssecond vessel, thence through said first conduit means to said first vessel, downwardly through said first vessel, thence through said second conduit means back to said second vessel,
first inlet means adapted to introduce a mixture of phosphate rock and phosphoric acid into that segment of said flow path formed by the lower portions, respectively, of said first and second vessels and said second conduit means,
second inlet means adapted to introduce sulfuric acid into said first vessel,
means for withdrawing slurry from said flow path, and
means for producing a vacuum in said first vessel above the surface of the slurry passing therethrough.

19. The apparatus of claim 18 wherein said first inlet means is adapted to extend into said second vessel through the top thereof to a point near the bottom of said second vessel and below the surface of said slurry maintained therein, and introduce said phosphate rock-phosphoric acid mixture into said second vessel near the bottom thereof.

20. The apparatus of claim 18 wherein said first inlet means includes a premixing vessel, stirring means disposed within said premixing vessel, means for introducing phosphate rock into said premixing vessel, means for introducing phosphoric acid into said premixing vessel, and means interconnecting said premixing vessel and said flow path.

21. The apparatus of claim 20 wherein said second inlet means includes spray means to spray sulfuric acid over the surface of said slurry in said first vessel.

22. The apparatus of claim 17 including first conduit means connecting the upper portion of said second vessel to the lower portion of said first vessel, second conduit means connecting the lower portion of said second vessel to said first vessel, all said connections being below the level of slurry maintained in said apparatus,
pump means adapted to pass said slurry at a high rate of circulation downwardly from the upper portion of said second vessel, to said second conduit means, thence through said second conduit means to said first vessel, downwardly through said first vessel, thence through said first conduit means back to the upper portion of said second vessel,
first inlet means adapted to introduce a mixture of phosphate rock and phosphoric acid into said second vessel,
second inlet means adapted to introduce sulfuric acid into said first vessel,
means for withdrawing slurry from said flow path, and
means for producing a vacuum in said first vessel above the surface of the slurry passing therethrough.

23. The apparatus of claim 18 wherein said pump means is located in said second conduit means.

24. The apparatus of claim 18 wherein said first inlet means is adapted to introduce said phosphate rock-phosphoric acid mixture into said second conduit means.

25. The apparatus of claim 18 wherein heat exchange means are arranged in said second conduit means.

References Cited

UNITED STATES PATENTS

| | | | |
|---|---|---|---|
| 2,887,362 | 5/1959 | Lee | 23—165 |
| 2,897,053 | 7/1959 | Svanoe | 23—165 |
| 2,950,171 | 8/1960 | Macq | 23—165 |
| 3,257,168 | 6/1966 | Chelminski | 23—165 |
| 2,109,347 | 2/1938 | Beekhuis. | |
| 3,416,889 | 12/1968 | Caldwell | 23—165 |

HERBERT T. CARTER, Primary Examiner

U.S. Cl. X.R.

23—122, 260, 285

PO-1050
(5/69)

UNITED STATES PATENT OFFICE
CERTIFICATE OF CORRECTION

Patent No. 3,522,004      Dated July 28, 1970

Inventor(s) Edwin B. Lopker

It is certified that error appears in the above-identified patent and that said Letters Patent are hereby corrected as shown below:

Column 2, line 56, for "returing" read --returning--; line 68, for "different" read --difficult--. Column 6, line 13, for "mass of sulfate" read --mass of calcium sulfate--. Column 7, line 19, for "reaction" read --reactor--; line 36, for "exists" read --exist--. Column 9, line 42, for "incerase" read --increase--; line 58, for "calim" read --claim--; Column 10, line 15, for "calim" read --claim--; line 24, for "calim" read --claim--; line 31, for "calim" read --claim--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents